(12) United States Patent
Lee et al.

(10) Patent No.: US 6,912,613 B2
(45) Date of Patent: Jun. 28, 2005

(54) APPARATUS AND METHOD FOR CONNECTING BASE MODULE AND FUNCTION-EXTENDING MODULE IN AV SYSTEM

(75) Inventors: Sung-lyong Lee, Seoul (KR); Seong-uk Pyung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 477 days.

(21) Appl. No.: 09/955,301

(22) Filed: Sep. 19, 2001

(65) Prior Publication Data

US 2002/0055278 A1 May 9, 2002

(30) Foreign Application Priority Data

Sep. 19, 2000 (KR) .......................................... 2000-54995
Jul. 19, 2001 (KR) .......................................... 2001-43503

(51) Int. Cl.$^7$ .............................. G06F 13/00; G06F 3/00
(52) U.S. Cl. ............................ 710/316; 710/10; 710/38; 710/302
(58) Field of Search ................................ 710/9, 10, 40, 710/52, 302, 315, 316, 305; 709/253; 700/83; 386/96; 385/24; 382/232; 370/539; 348/722, 705; 379/93.14; 250/551

(56) References Cited

U.S. PATENT DOCUMENTS

| | | | | |
|---|---|---|---|---|
| 4,337,480 A | | 6/1982 | Bourassin et al. | |
| 5,123,015 A | * | 6/1992 | Brady et al. | 370/539 |
| 5,486,877 A | * | 1/1996 | Tanaka | 348/722 |
| 5,541,670 A | * | 7/1996 | Hanai | 348/705 |
| 5,591,984 A | * | 1/1997 | Drucker | 250/551 |
| 5,598,278 A | * | 1/1997 | Tanaka et al. | 386/96 |
| 5,621,659 A | * | 4/1997 | Matsumoto et al. | 710/10 |
| 5,784,648 A | * | 7/1998 | Duckwall | 710/40 |
| 5,787,259 A | * | 7/1998 | Haroun et al. | 709/253 |
| 5,852,655 A | * | 12/1998 | McHale et al. | 379/93.14 |
| 6,047,343 A | * | 4/2000 | Olarig | 710/302 |
| 6,098,138 A | * | 8/2000 | Martinelli et al. | 710/315 |
| 6,253,114 B1 | * | 6/2001 | Takihara | 700/83 |
| 6,256,700 B1 | * | 7/2001 | Sauber | 710/316 |
| 6,310,992 B1 | * | 10/2001 | Gehrke et al. | 385/24 |
| 6,363,452 B1 | * | 3/2002 | Lach | 710/316 |
| 6,484,215 B1 | * | 11/2002 | Gibart et al. | 710/9 |
| 6,580,827 B2 | * | 6/2003 | Ueda | 382/232 |
| 6,658,504 B1 | * | 12/2003 | Lieber et al. | 710/52 |
| 2003/0115396 A1 | * | 6/2003 | Leinen | 710/305 |

FOREIGN PATENT DOCUMENTS

JP          02-246400       10/1990

OTHER PUBLICATIONS

*Korean Office action* from the Korean Intellectual Property Office issued in Applicant's corresponding Korean Patent Application No. 10–2001–0043503 (dated Apr. 27, 2004).

* cited by examiner

*Primary Examiner*—Glenn A. Auve
*Assistant Examiner*—Christopher E. Lee
(74) *Attorney, Agent, or Firm*—Robert E. Bushnell, Esq.

(57) ABSTRACT

An apparatus and method connect a function-extending module and a base module installed in an audio/video (AV) system reproducing various AV source data. The apparatus connects a function-extending module, which is detachably inserted into a module rack, to a base module capable of reproducing AV data to be communicated between the function-extending module and the base module. The apparatus includes a detecting unit for detecting the installation of function-extending module(s) in the module rack, a switching unit for connecting the base module and the function-extending module(s) and for connecting function-extending modules to each other, and a control unit for controlling the switching unit so that the function-extending module(s) is (are) connected to the base module in a daisy-chain fashion according to a detection signal from the detecting unit. The function-extending module can be automatically connected to the base module without any additional installation, and in a daisy-chain fashion independently with respect to installation position and order in the module rack.

14 Claims, 9 Drawing Sheets

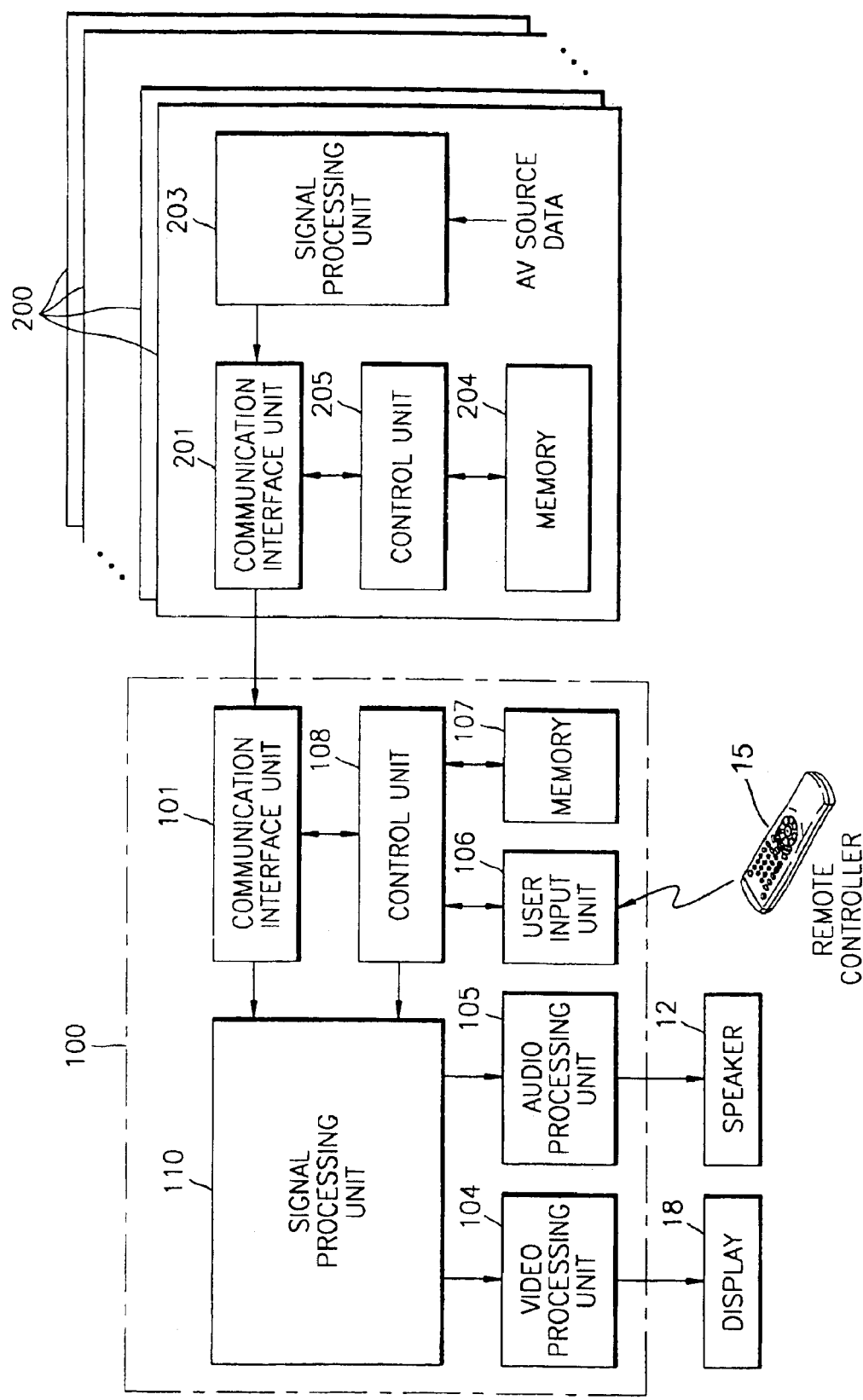

FIG. 5

| | OSI REF MODEL | TCP/IP | USER-CONTROL | VESA-HNC | N/W CONF | INTER-DEVICE CONTROL | A/V DATA FLOW | NETWORK INTERFACE |
|---|---|---|---|---|---|---|---|---|
| 7 | APPLICATION | APPLICATION | GUI | | NET.INFO | CMD CODE | AUDIO, VIDEO, DATA | GATEWAY |
| 6 | PRESENTATION | | HTTP | VESA-HN CONTROL PROTOCOL (RESERVED) | DHCP | IEC61883 FCP | TRANSPORT STREAM COPY PROTECTION IEC61883-CMP | |
| 5 | SESSION | | | | | | | |
| 4 | TRANSPORT | TRANSPORT | TCP | | UDP | | | |
| 3 | NETWORK | INTERNET | IP AND ARP | | | | | ROUTER |
| 2 | DATA LINK | NETWORK INTERFACE | IEEE 1394(ASYNCH), GENERAL NETWORK | | | | IEEE 1394 (ISOCH) | BRIDGE |
| 1 | PHYSICAL | | | | | | | REPEATER |

…

APPARATUS AND METHOD FOR CONNECTING BASE MODULE AND FUNCTION-EXTENDING MODULE IN AV SYSTEM

CLAIM OF PRIORITY

This application makes reference to, incorporates the same herein, and claims all benefits accruing under 35 U.S.C. §119 from my two applications for APPARATUS AND METHOD FOR CONNECTING MODULES IN MODULAR TELEVISION APPARATUS filed in the Korean Industrial Property Office on 19 Sep. 2000 and there duly assigned Serial No. 2000-54995, and APPARATUS AND METHOD FOR CONNECTING BASE MODULE AND FUNCTION-EXTENDING MODULE IN AV SYSTEM filed in the Korean Industrial Property Office on 19 Jul. 2001 and there duly assigned Serial No. 2001-43503.

BACKGROUND OF THE INVENTION

1. Technical Field

The present invention relates to an audio/video (AV) system and, more particularly, to an apparatus and method for connecting a base module and a function-extending module installed in the AV system that reproduces various AV source data.

2. Related Art

Digital ground wave broadcasting has already begun in some countries and is being prepared in some countries. To keep pace with this trend, consumer electronics product manufacturers are producing a large variety of digital media products, including digital television (TV) sets capable of receiving digital broadcasting, digital versatile disc (DVD) players and digital camcorders capable of recording and reproducing digital broadcasting. Therefore, it is not easy for consumers to obtain information regarding various products.

As various digital media apparatuses particularly related to the digital TV market are being disclosed, potential consumers are being confused. New specifications are being developed at such a fast rate that digital TVs are becoming more complicated and new products are quickly becoming obsolete.

New digital media products, such as digital broadcast receiving apparatuses, satellite broadcast receiving apparatuses, DVD players, hard disc drives, and Internet access apparatuses, are being designed in such a way as to increase the number of manipulation methods a user has to learn and the number of remote controllers which must be used. In addition, a user has to pay a lot of money to buy digital media products. Also, the digital media products take up a large amount of space in a house, and each digital media product needs a power line for operation. In order to operate a product, such as a DVD player, which reproduces scenes displayed on a digital TV, the product should be connected to a digital TV using an electric cable.

As a solution to these problems, the applicant has already filed an application disclosing an AV system, including a base module capable of receiving and reproducing various AV source data from at least one function-extending module. According to the above AV system, it is possible to realize various digital media functions such as those of a DVD player and an MP3 player through a selected function-extending module. However, despite this advantage, the AV system can still be inconvenient to use if the connection of the previously installed function-extending module(s) and a base module must be newly set up whenever a new function-extending module is added.

SUMMARY OF THE INVENTION

To solve the above problems, a first object of the present invention is to provide an apparatus requiring no additional installation for connection when a function-extending module is inserted into a module rack to be connected to a base module, and a method therefor.

A second object of the present invention is to provide an apparatus and method for inserting a function-extending module into a module rack in daisy-chain fashion regardless of the installation position or order when the function-extending module and the base module are connected to each other by an IEEE 1394 interface.

Accordingly, to achieve the first object, there is provided an apparatus for connecting a function-extending module, which is detachably inserted into a module rack, to a base module capable of reproducing audio/video (AV) data to be communicated between the function-extending module and the base module. The apparatus includes a detecting unit for detecting the installation of the function-extending module in the module rack, a switching unit for connecting the base module and the function-extending module (or function-extending modules), and one function-extending module and another function-extending module, and a control unit for controlling the switching unit so that the function-extending module is connected to the base module in a daisy-chain fashion according to a detection signal of the detecting unit.

In this regard, the base module includes an IEEE 1394 port and the function-extending modules include first and second IEEE 1394 ports.

The switching unit preferably includes a first switching part for selectively connecting the IEEE 1394 port included in the base module and one of the first IEEE 1394 ports of at least one function-extending module, and a second switching part for selectively connecting one of the second IEEE 1394 ports of at least one function-extending module and one of the IEEE 1394 ports of the other function-extending modules.

To achieve the second object, there is provided a method for connecting a function-extending module, which is detachably inserted into the module rack, to a base module capable of reproducing audio/video (AV) data to be communicated. The method includes the steps of: (a) detecting whether the function-extending module is inserted into the module rack, and (b) connecting the detected function-extending module to the installed function-extending module in a daisy-chain fashion with regard to the base module.

It is preferable that step (b) include checking for the presence of the previously installed function-extending module, and connecting the base module to the newly installed function-extending module when the previously installed function-extending module does not exist.

It is further preferable that step (b) include checking for the presence of the previously installed function-extending module, and connecting the previously installed function-extending module to the newly installed function-extending module when there is only one previously installed function-extending module, and detachably connecting the newly installed function-extending module to the base module.

It is also preferable that step (b) include checking for the presence of the previously installed function-extending module, and connecting the newly installed function-extending module to the function-extending module, which constitutes the last node of the daisy chain of the previously installed function-extending modules, when the number of previously installed function-extending modules is two or more, and connecting the newly installed function-extending module to the base module.

BRIEF DESCRIPTION OF THE DRAWINGS

The above objects and advantages of the present invention will become more apparent from the following detailed description of a preferred embodiment thereof with reference to the attached drawings in which:

FIG. 4 is a block diagram of the base module and the function-extending module;

FIG. 5 is a diagram of communications protocol according to OSI reference models and TCP/IP hierarchical structures adopting the base module and the function-extending module according to a preferred embodiment of the present invention for communications based on a client-server model;

DESCRIPTION OF THE PREFERRED EMBODIMENTS

Figure 1A:
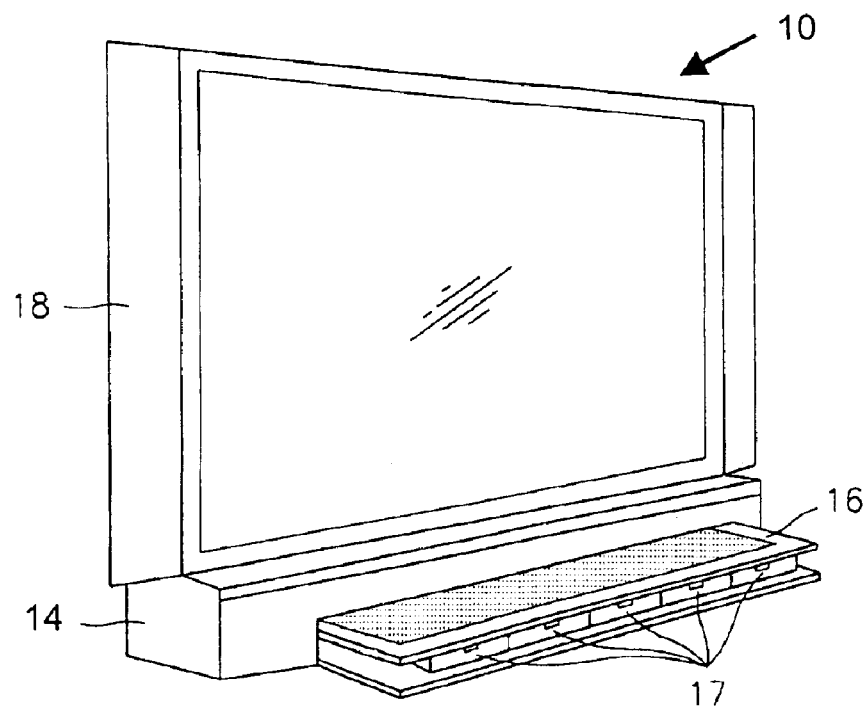
FIGS. 1A thru 1C are views showing an external appearance of a modular television as a preferred embodiment of an audio/video (A/V) system according to the present invention.

Hereinafter, the present invention will be described in detail by explaining a preferred embodiment of the present invention with reference to the attached drawings. Like reference numerals in the drawings denote like members.

Figure 1B:
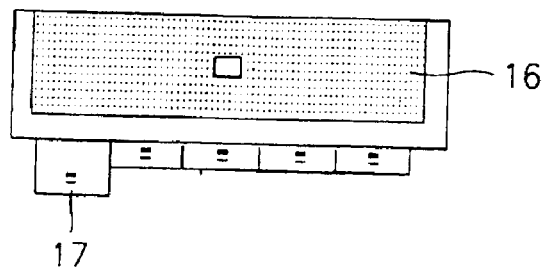
Figure 1C:
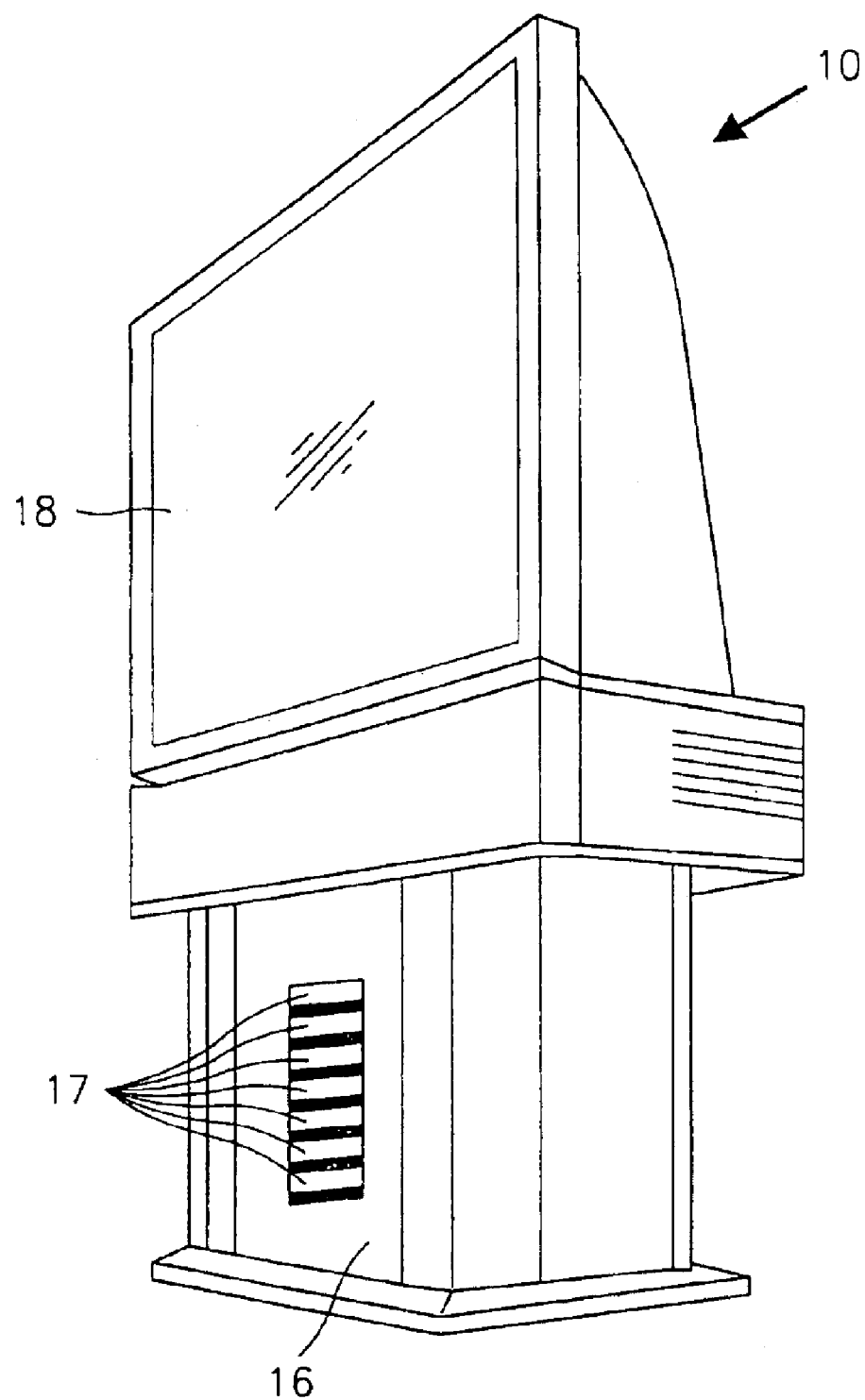

FIGS. 1A and 1C are views of an external appearance of a modular television system as a preferred embodiment of an A/V system according to the present invention, while FIG. 1B is a plan view of the function-extending modules of FIG. 1A. Referring to FIG. 1A, a modular TV system 10 has a display device 18 supported by a TV stand 14. The display device 18 may be a cathode-ray tube (CRT), a ferroelectric LCD (FLCD), a field emission display (FED), or a plasma display panel (PDP). A module rack 16 is installed at the center of the TV stand 14 under the display device 18, and speakers (not shown) are installed to the right and left of the module rack 16.

The module rack 16 has a plurality of module-inserting holes to which function-extending modules 17 are detachably attached. FIG. 1A shows that the module-inserting holes are formed in a horizontal line so that a plurality of function-extending modules 17 can be inserted in a row, whereas FIG. 1C shows that the module-inserting holes are formed in a vertical line. At least one function-extending module 17 can be inserted into the module rack 16.

Function-extending modules 17 are for extending the functions of the modular TV system 10. For example, if a user buys a DVD module, which is an example of a function-extending module, and installs the DVD module in the module rack 16, the modular TV system will have a DVD player function.

A base module (not shown) is installed at the back of the module rack 16. The base module communicates control commands with the function-extending modules 17 in a client-server fashion. That is, the base module receives control information from the function-extending modules 17 inserted into the module rack 16, and outputs and displays the received control information on the display device 18. If a user input corresponding to the displayed control information is received, the base module sends the user input to a corresponding one of the function-extending modules 17. The function-extending module 17 sends A/V data corresponding to the received user input to the base module. The base module processes the received A/V data, and then outputs the A/V data to the display device 18 and/or the speakers (not shown).

The function-extending modules 17 store control information for controlling themselves. When the function-extending modules 17 are inserted into the module rack 16, the control information is sent to the base module. Thereafter, the base module transmits a control order to the corresponding one of the function-extending modules 17 based on the received control information. For example, the function-extending modules 17 store an index page containing control information for controlling themselves, and the base module has a browser for selecting the function-extending modules 17. The browser displays for the user a main page in which selection information for at least one of the function-extending modules 17 is contained. The browser requests an index page from a function-extending module 17 selected by the user through the main page, and displays the index page to the user. If the user inputs a control command through the displayed index page, the browser sends the control command again to the function-extending module 17.

Figure 2:
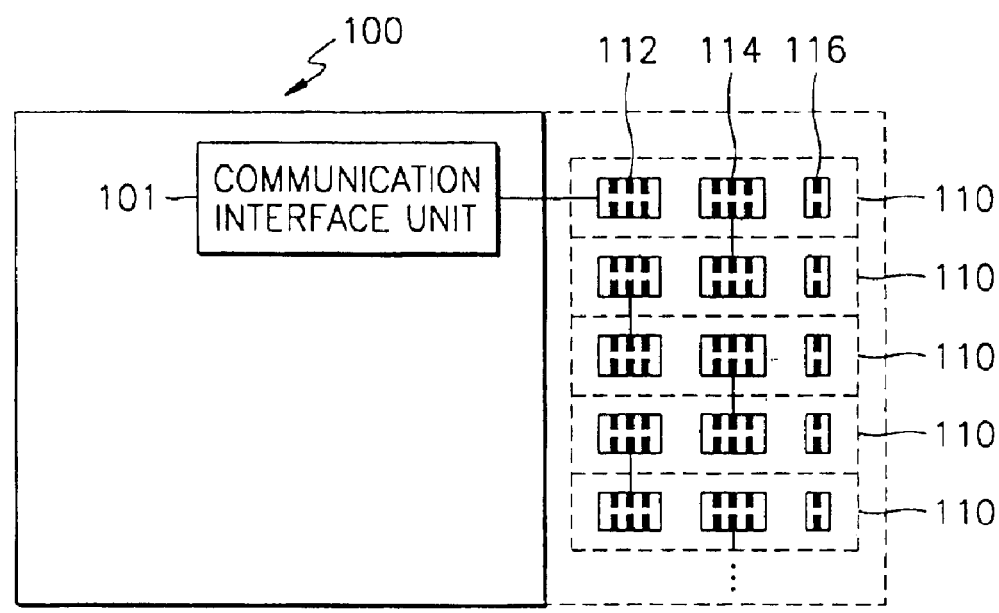
FIGS. 2 and 3 are diagrams used to explain hardware-connection structures of a base module and a function-extending module.
Figure 3:
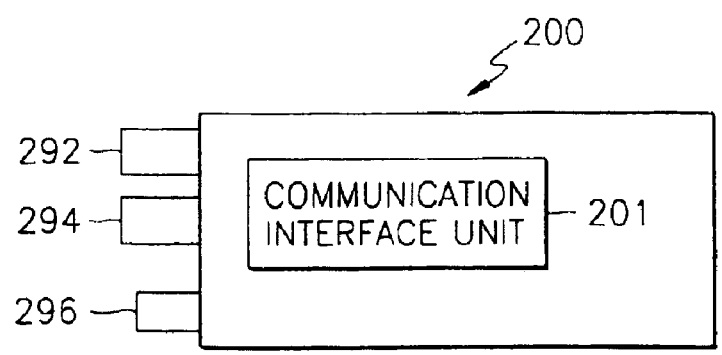

FIGS. 2 and 3 are diagrams used to explain hardware connection structures of a base module and function-extending modules.

Referring to FIG. 2, the base module 100 has a plurality of ports 110 for module connection. Each port 110 contains two communications ports 112 and 114 and one power connection port 116. The two communications ports 112 and 114 and the power connection port 116 are designed so that each function-extending module can be easily inserted and connected into a module-inserting hole (not shown) of the module rack 16.

Referring to FIG. 3, a function-extending module 200 also has two communications ports 292 and 294 and one power connection port 296. The function-extending module 200 is in the form of a casing, and the communications ports 292 and 294 and power connection port 296 are formed so as to protrude from the casing. Therefore, if the function-extending module 200 is inserted into a module-inserting hole formed in the module rack 16, the corresponding ports 112, 114, 116 and 292, 294, 296 contact each other, and the base module 100 and the function-extending module 200 are electrically connected. Also, if a plurality of function-extending modules 200 is inserted into the module rack 16, the function-extending modules 200 are connected to the base module 100 in a daisy-chain fashion regardless of the insertion order and position. In this case, communications ports 112 and 114 of the base module 100 and communications ports 292 and 294 of the function-extending module 200 are electrically connected to their own communications interface units 101 and 201, respectively.

FIG. 4 is a block diagram of the base module 100 and the function-extending modules 200. Referring to FIG. 4, the base module 100 has a communications interface unit 101, a signal processing unit 110, a video processing unit 104, an audio processing unit 105, a user input unit 106, a memory unit 107, and a control unit 108.

The memory unit 107 includes a random access memory (RAM), a read-only memory (ROM), and a flash memory depending on the embodiment of the present invention. The RAM is used as a buffer for processing image data which forms a main page to be explained later, the ROM includes a browser used for searching for a function-extending module 200 and an automatic connection program code for automatically connecting to a module, which is needed in realizing the present invention, and the flash memory stores the Internet protocol (IP) address of the function-extending module 200.

The control unit 108 receives an IP address from the function-extending module 200 installed in the module rack 16, and operates the browser included in the memory 107, thereby enabling communication between the function-extending module 200 and a client-server through the communication interface unit 101. Also, the control unit 108 allows the function-extending module 200 to be connected with base module 100 in a daisy chain fashion according to the module automatic connection program included in the memory 107 as explained later.

The user input unit 106 receives user inputs, which are input through a command key (not shown) or a remote controller 15, and sends the user inputs to the control unit 108. The communications interface unit 101 carries on data communication with outside sources. In the signal processing unit 110, the A/V data, which is received through the communications interface unit 101, is divided into video data and audio data, and is processed. Then, the video data and audio data are outputted to the video processing unit 104 and the audio processing unit 105, respectively. The video processing unit 104 processes the video data output from the signal processing unit 110, and sends the video data to the display device 18. The audio processing unit 105 processes the audio data outputted from the signal processing unit 110, and sends the audio data to a speaker 12.

The function-extending module 200 has a communications interface unit 201, a signal processing unit 203, a memory unit 204, and a control unit 205. The communications interface unit 201 communicates with the base module 100. The memory unit 204 stores an IP address assigned to the function-extending module 200, an index page, and a function-performing program needed to perform a function given to the function-extending module 200, and, when necessary, source A/V data. The signal processing unit 203 signal processes source A/V data and outputs the processed A/V data to the communications interface unit 201. The control unit 205 provides the IP address and index page to the base module 100, and responds to a user input, which is received by the base module 100, so that the corresponding processed A/V data can be sent to the base module 100. Also, when necessary, the control unit 205 sends an install program, which the base module 100 requires to control the function-extending module 200, to the base module 100.

The source A/V data is data that is requested by the user, and is provided to the function-extending module 200 from an external source or is stored in the memory 204 of the function-extending module 200. The type of source A/V data depends on the function of the function-extending module 200. If the function-extending module 200 is a DVD module for performing a DVD player function, the source A/V data is A/V data recorded on the DVD. If the function-extending module 200 is a hard disk drive (HDD) module, the source A/V data is predetermined data recorded on a hard disk.

The signal processing unit 203 processes signals appropriately depending on the characteristics of the source A/V data. For example, if the function-extending module 200 is a cable broadcast receiving module for receiving a cable broadcast signal, the signal processing unit 203 demodulates and decodes a cable broadcast signal received through a tuner. If the function-extending module 200 is a DVD module, the signal processing unit 203 decodes data read from a DVD and provides the decoded data to the communications interface unit 201, or encodes data provided by other function-extending modules and records the encoded data on the DVD.

The memory unit 204 has a RAM, a ROM, and a flash memory as does the memory unit 107 of the base module 100. The RAM may be used as a buffer. The ROM stores an application program so that the function-extending module 200 can operate as a server for the browser in the base module 100. In particular, the ROM stores an index page that is needed by the function-extending module 200 operating as a server to the base module 100. The flash memory stores an IP address assigned to the function-extending module 200.

If the function-extending module 200 communicates an MPEG transport stream with the base module 100, the signal processing unit 203 has a transport stream processing part which multiplexes or demultiplexes the MPEG transport stream. If the communications interface unit 201 is implemented as an IEEE1394 interface unit, the communications interface unit 201 sends and receives an MPEG transport stream, a state signal or a control signal, which are sent according to the IEEE1394 protocol.

FIG. 5 is a diagram of communications protocol according to OSI reference models and TCP/IP hierarchical structures adopted in the base module 100 and the function-extending module 200 as a preferred embodiment of the present invention for communications based on a client-server model. Referring to FIG. 5, a graphical user interface (GUI) is adopted for user control in the application layer, and the base module 100 and the function-extending module 200 communicate with each other in a client-server fashion based on a hypertext transfer protocol (HTTP). In the transport layer, packet communications are based on TCP/IP (ARP), and the physical layer and the data link layer (OSI reference model) are based on the IEEE 1394 protocol. However, a protocol adopted in each layer may change in various ways according to necessity.

Figure 6:
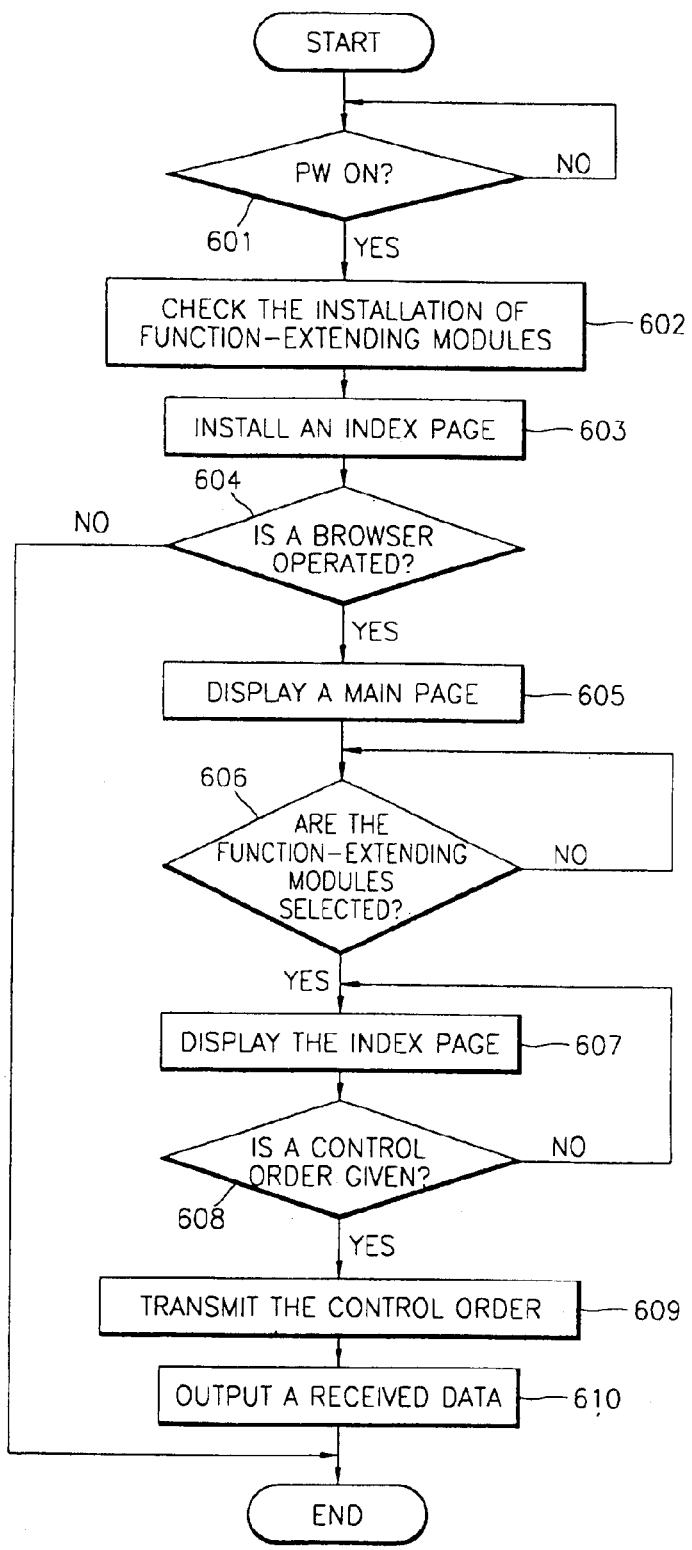
FIG. 6 is a flowchart illustrating a process in which AV data is reproduced through the base module and the function-extending module.

FIG. 6 is a flowchart illustrating how AV data is reproduced through the base module 100 and the function-extending module 200. Referring to FIG. 6, if an AV system is turned on (step 601), the base module 100, which is a client, checks to see if the function-extending module 200, which is a server, is inserted into the module rack 16 (step 602).

The inserted function-extending module 200 sends an index page to the base module 100, and the provided index page is installed in the base module (step 603). At this time, an IP address and the index page are transmitted by the function-extending module 200, and are then stored by the base module 100.

Figure 7:
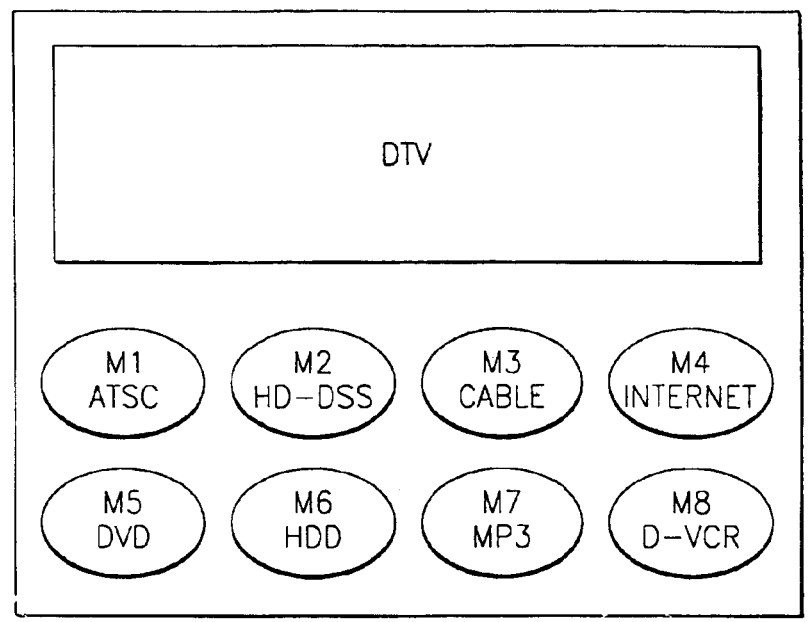
FIG. 7 is a diagram showing an example of a main page.

When a user is not operating a browser (step 604), the process ends, but if the user operates a browser included in the base module 100 (step 604), a main page is displayed (step 605), and the main page is shown in FIG. 7. In the main page, icons indicating the various function-extending modules 200 described above (e.g., M1 thru M8) are displayed. In the latter regard, M1 denotes a digital broadcast receiving module, M2 denotes a digital satellite broadcast receiving module, M3 denotes a cable broadcast receiving module, M4 denotes an internet access module, M5 denotes a DVD module, M6 denotes a hard disc drive module, M7 denotes an MP3 module, and M8 denotes a D-VCR module. An icon displayed on the main page is either transmitted from each function-extending module 200 to be displayed, or is stored in the base module 100 and then displayed in the main page. If the main page is formed so that an icon is to be transmitted from each function-extending module 200 by a browser in the base module 100, the manufacturer of the function-extending modules 200 may load various icons in the function-extending modules 200 so that icons displayed in the main page can change in various ways.

If the user selects one of the function-extending modules 200 displayed on the main page (step 606), a browser stored in the base module 100 calls the index page corresponding to the function-extending module 200 to be displayed (step 607). At this point, the index page can be called directly from the corresponding module 200 in step 607 without performing step 603.

The GUI is indicated in the displayed index page. When an icon which performs a specified function is selected (step 608), a control command related to the selected icon (which is input by a user) is transferred to the corresponding function-extending module 200 (step 609). As a result, an operation corresponding to the transferred control command is performed in the function-extending module 200. For instance, when specific content and an icon related to a reproduction order are selected from the index page of the corresponding function-extending module 200, the title of the selected content and a reproduction control command are transferred to the corresponding function-extending module 200. Then, the corresponding function-extending module 200 reads the selected content and sends it to the base module 100. Finally, the base module 100 processes data received from the corresponding function-extending module 200 and outputs the same (step 610).

Figure 8:
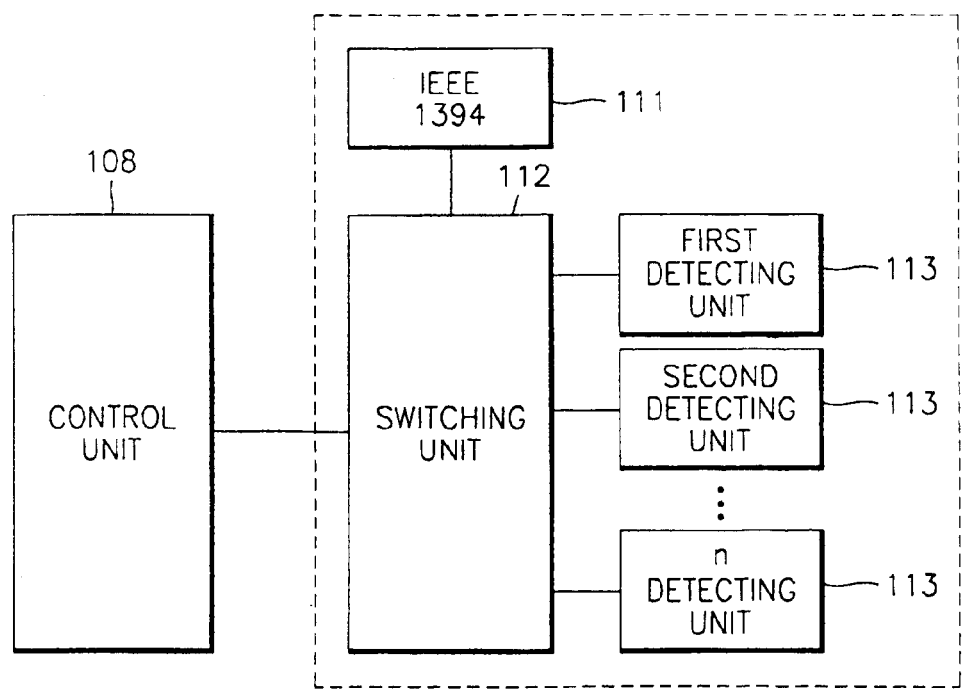
FIG. 8 is a block diagram of a connection device as a preferred embodiment of the present invention.

FIG. 8 is a block diagram used to explain a structure for connecting the base module 100 and a function-extending module 200 as a preferred embodiment of the present invention. Referring to FIG. 8, the connection device according to the present invention is formed as a single body with the base module 100. Specifically, the connection unit can be installed in the control unit 108 of the base module 100 and the communication interface unit 101 of base module 100 (FIG. 8). Therefore, it includes the control unit 108, an IEEE 1394 module 111, a switching unit 112 and n detecting units 113.

Each of the n detecting units 113 detects whether the corresponding function-extending module 200 is attached to the module rack 16, and informs the control unit 108 of the result. As the above-described module automation connection program operates and the function-extending module 200 is inserted into the module rack 16, the control unit 108 controls the switching unit 112 so that the inserted function-extending module 200 and the base module 100 are connected with each other in a daisy chain fashion. The switching unit 112 switches each connection node according to a control signal from the control unit 108, so that the IEEE 1394 module 111 is connected to the inserted function-extending module 200 in a daisy chain fashion.

Figure 9:
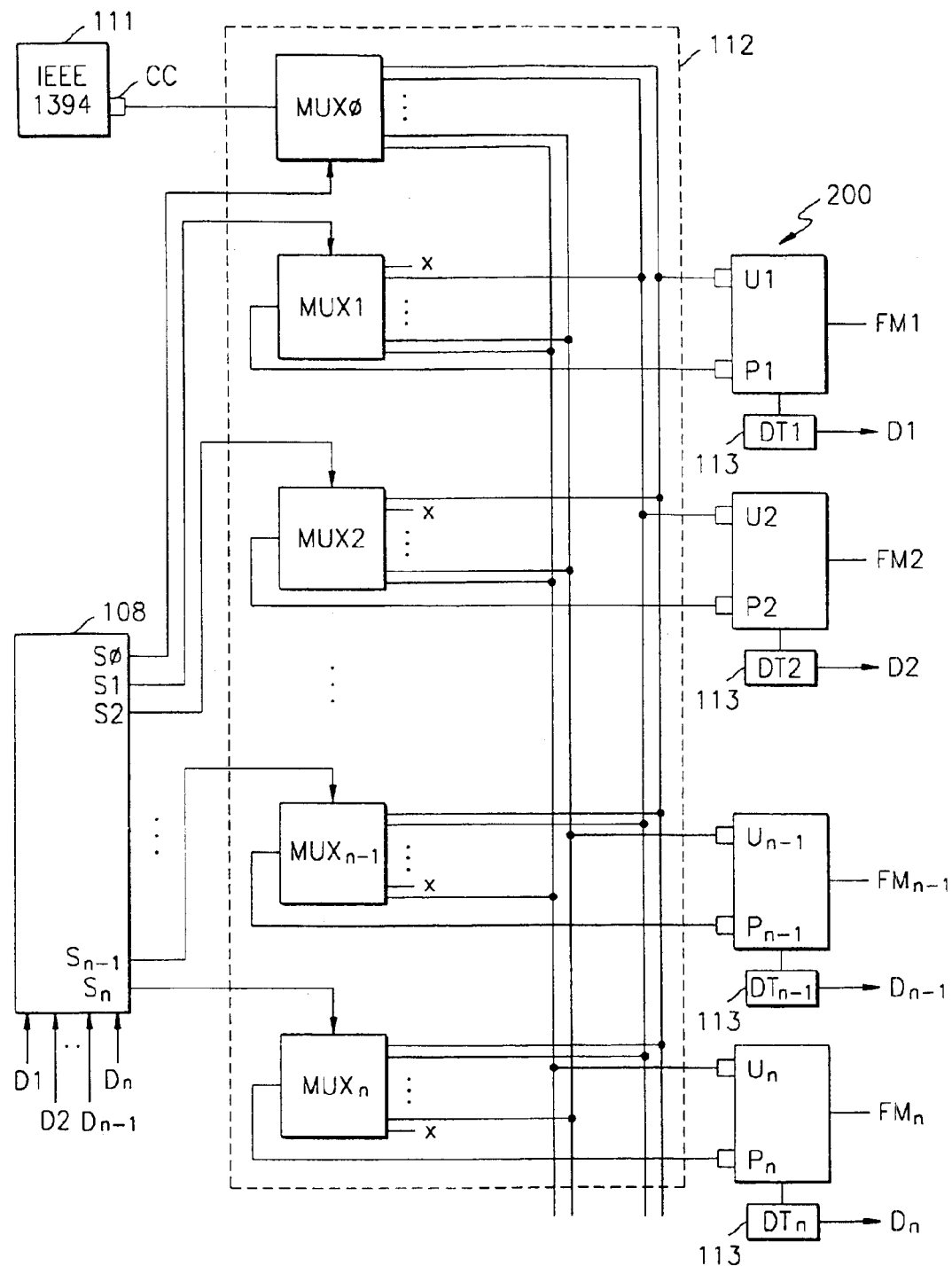
FIG. 9 is a diagram showing an example of a circuit structure shown in FIG. 8.

FIG. 9 is a diagram of an example of the circuit structure shown in FIG. 8. Referring to FIG. 9, the n detecting units 113 (DT1, DT2, DT3, DT4, . . . , DTn) send to the control unit 108 detecting signals D1, D2, . . . , Dn indicating whether the function-extending modules 200 (FM1, FM2, FM3, FM4, . . . , FMn) are inserted into the module rack 16.

The switching unit 112 includes a first switching part MUX0 and a second switching part. The second switching part includes n switching devices MUX1, MUX2, MUX3, MUX4, . . . , MUXn.

The IEEE1394 module 111 is connected to the first switching part MUX0. In response to a control signal S0 from the control unit 108, the first switching part MUX0 selectively connects a port installed in the base module 100 as a client to one of a plurality of first IEEE 1394 ports U1, U2, . . . , Un of the function-extending module 200 (FM1, FM2, FM3, FM4, . . . , FMn) as a server. The n switching devices MUX1, MUX2, MUX3, MUX4, . . . , MUXn, which are installed in the second switching part, correspond to the function-extending modules FM1, FM2, FM3, FM4, . . . , FMn, respectively. A common port of each switching device MUXi is connected to the second IEEE 1394 port P1, P2, P3, P4, . . . , or Pn of its corresponding function-extending module FMi ($1 \leq i \leq n$, n is an integer). Except for the ith selection port, the remaining n–1 selection ports installed in each switching device MUXi are each connected to the first IEEE 1394 ports U1, . . . , Ui–1, Ui+1, . . . , Un of the corresponding function-extending modules FM1, . . . , FMi–1, FMi+1, . . . , FMn, respectively. Each switching device MUXi connects the common port to one of the selection ports in response to a control signal Si generated by the control unit 108.

Figure 10:
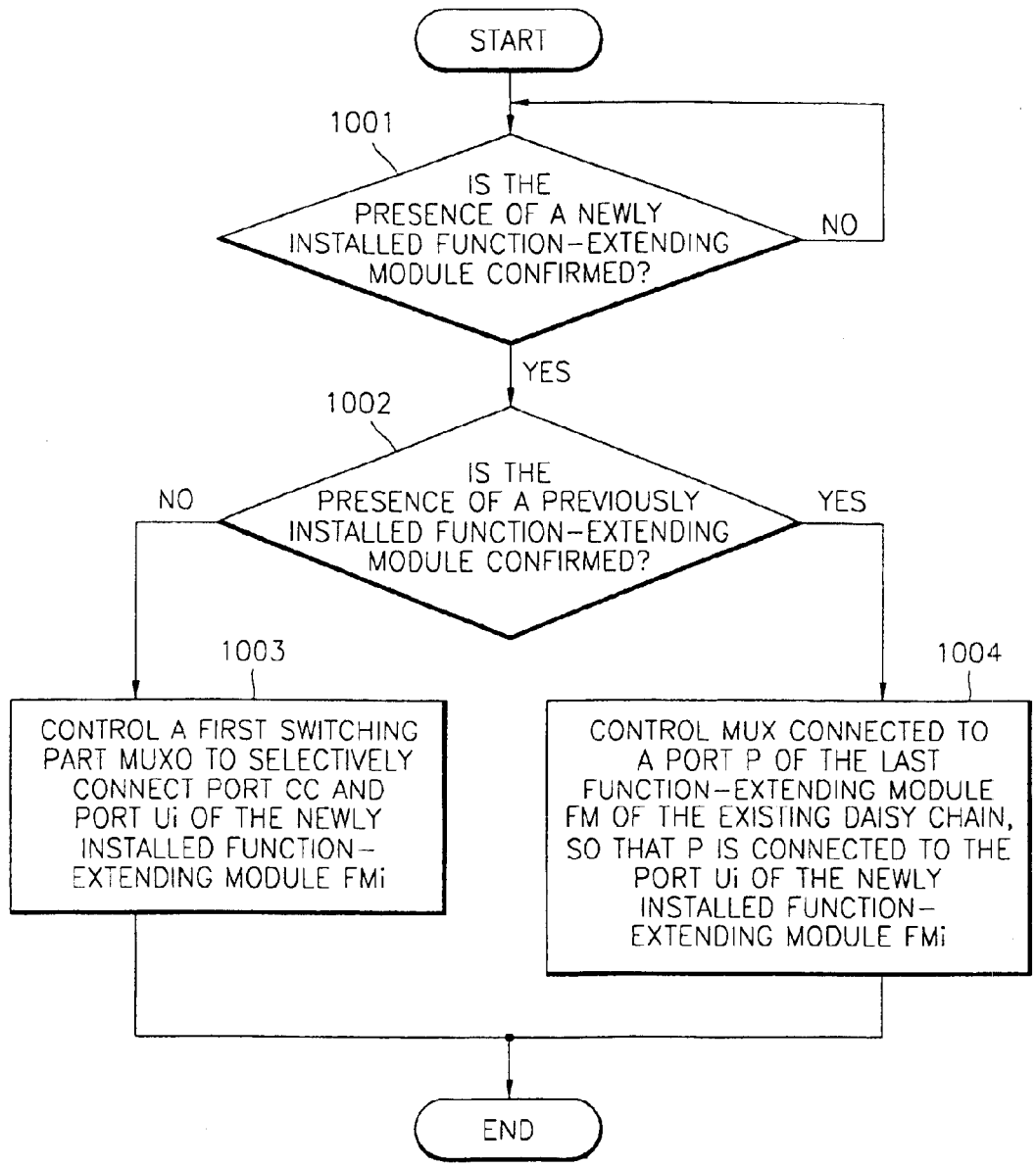
FIG. 10 is a flowchart illustrating a method of connecting the base module and the function-extending module as a preferred embodiment of the present invention in an AV system.

FIG. 10 is a flowchart used to explain a method of connecting the function-extending module 200 and the base module 100 as a preferred embodiment of the present invention in an AV system. Referring to FIG. 10, the function-extending module FMi is inserted into a module-inserting hole of the module rack 16 regardless of installation position and order. Then, the module automatic connection program is operated by the control unit 108 so that the previously installed function-extending module FM is connected to the newly installed function-extending module FMi in a daisy-chain fashion.

Specifically, the control unit 108 receives a detection signal Di from a detecting unit DTi and confirms the installation of the new function-extending module FMi in the module rack 16 (step 1001). Once the confirmation is completed, the control unit 108 checks for the presence of the previously installed function-extending module FM (step 1002). If there is no previously installed function-extending module, the control unit 108 sends a control signal S0 to the first switching part MUX0. Then, the first switching part MUX0 connects the port Ui of the newly installed function-extending module FMi to a port CC of the IEEE 1394 interface module 111 of the base module 100 (step 1003). On the contrary, if there is a previously installed function-extending module, the control unit 108 connects the port Ui of the newly installed function-extending module FMi to a port P of the previously installed function-extending module FM, which constitutes the last node of the daisy chain of the previously installed function-extending module.

In the event that there is only one previously installed function-extending module 200 and it is indicated as FM1, the control unit 108 sends a control signal S1 to the switching device MUX1 included in the second switching part when the function-extending module FMi is installed. Then, the switching device MUX1 connects the common port to the ith selection port. At this time, the port P1 of the function-extending module FM1 and the port Pi of the function-extending module FMi are connected with each other through the switching device MUX1 included in the second switching part, so that the function-extending modules FM and FMi are connected with each other in a daisy-chain fashion (step 1004).

On the other hand, in the event that there are two previously installed function-extending modules 200, indicated as FM1 and FM2, the control unit 108 sends a control signal S2 to the switching device MUX2 included in the second switching part when the function-extending module FMi is newly installed. Then, the switching device MUX2 connects the common port to the ith selection port. At this point, the port P2 of the function-extending module FM2 and the port Pi of the function-extending module FMi are connected with each other through the switching device MUX2 included in the second switching part, so that the function-extending modules FM1, FM2 and FMi are connected with one another in a daisy-chain fashion (step 1004).

Under the above-described condition, if the function-extending module FM2 is detached from the module rack 16, the control unit 108 sends the control signal S1 to the switching device MUX1 to connect the common port of the switching device MUX1 of the second switching part and the ith selection port rather than the second selection port. As a result, it is possible to maintain the connection of the function-extending modules FM1 and FMi in a daisy-chain fashion. Further, when the function-extending module FM1 is detached from the module rack 16, the control unit 108 sends the control signal SO to the first switching part MUX0 so that the first switching part MUX0 is switched from the first selection port to the ith selection port. Therefore, it is possible to keep the connection of the function-extending modules FM2 and FMi in a daisy-chain fashion As described above, the present invention provides an apparatus and method for installing the function-extending module to be connected to the base module in the module rack. The apparatus and method have an advantage in that any additional setup is not needed when connecting the function-extending module and the base module. Further, if the function-extending module is connected to the base module by an IEEE 1394 interface, the function-extending module can be automatically connected to the base module in a daisy-chain fashion independently relative to the installation position and order in the module rack.

While the present invention has been particularly shown and described with reference to preferred embodiments thereof, it will be understood by those skilled in the art that various changes in form and detail may be made without departing from the spirit and scope of the invention as defined by the appended claims.

What is claimed is:

1. An apparatus for connecting at least one function-extending module, which is detachably inserted into a module rack, to a base module capable of reproducing audio/video (AV) data to be communicated between said at least one function-extending module and the base module, the apparatus comprising:

a detecting unit for detecting the installation of said at least one function-extending module in the module rack and for generating a detection signal;

a switching unit for connecting the base module to said at least one function-extending module; and a control unit for controlling the switching unit so that said at least one function-extending module is connected to the base module in a daisy-chain fashion according to the detection signal from the detecting unit;

wherein the base module has a port and each function-extending module has first and second ports;

wherein the switching unit comprises a first switching part for selectively connecting the port of the base module to the first port of one function-extending module, and a second switching part for selectively connecting the second port of said one function-extending module to the first port of any other function-extending module;

wherein the second switching part comprises n switching devices, each switching device corresponding to a given function-extending module, said each switching device comprising a common port and n−1 selection ports, one selection port for each of n−1 other switching devices; and wherein the common port of said each switching device is connected to the second port of said given function-extending module, and said n−1 selection ports of said each switching device are connected to the first port of n−1 other function-extending modules, respectively.

2. The apparatus of claim 1, wherein the port of the base module comprises an IEEE 1394 port and said first and second ports of said each function-extending module are IEEE 1394 ports.

3. The apparatus of claim 1, wherein the detecting unit sends the detection signal to the control unit, the detection signal indicating whether a corresponding function-extending module is inserted into the module rack, said control unit generating a control signal; and wherein the first switching part selectively connects the port of the base module to the first port of said one function-extending module in response to the control signal generated by the control unit.

4. The apparatus of claim 1, wherein said each switching device connects one of the selection ports to its common port in response to another control signal generated by the control unit.

5. The apparatus of claim 1, wherein said at least one function-extending module comprises a plurality of function-extending modules, and wherein said switching unit establishes interconnections between respective function-extending modules.

6. A method for connecting a plurality of function-extending modules, which are detachably inserted into a module rack, to a base module capable of reproducing audio/video (AV) data to be communicated, the method comprising the steps of:

(a) providing a switching unit having a first port connected to the base module, said switching unit including a plurality of switching devices, one for each function-extending module, each switching device having a common port and a plurality of selection ports;

(b) connecting the common port of each switching device to a first port of a respective one of said function-extending modules;

(c) connecting each selection port of said each switching device to a second port of a corresponding one of said function-extending modules other than said respective one of said function-extending modules;

(d) detecting whether said function-extending modules are inserted into the module rack; and (e) connecting the detected said function-extending modules to the base module.

7. The method of claim 6, wherein step (e) comprises:

(e11) checking for presence of a previously installed function-extending module; and (e12) connecting the base module to said at least one function-extending module when the previously installed function-extending module is not present.

8. The method of claim 6, wherein step (e) comprises:

(e21) checking for presence of a previously installed function-extending module; and (e22) connecting the previously installed function-extending module to a newly installed function-extending module and connecting the newly installed function-extending module to the base module when only one previously installed function-extending module is present.

9. The method of claim 6, wherein step (e) comprises:

(e31) checking for presence of previously installed function-extending modules; and (e32) connecting a newly installed function-extending module to a function-extending module which constitutes a last node of a daisy chain of the previously installed function-extending modules when a number of the previously installed function-extending modules is at least two, and connecting the newly installed function-extending module to the base module.

10. The method of claim 6, wherein step (e) further comprises connecting said detected at lease one function-extending module to an installed function-extending module in the daisy-chain fashion.

11. A recording medium having program codes that connect a newly installed function-extending module, which is detachably inserted into a module rack, to a base module capable of reproducing audio/video (AV) data to be communicated, the medium comprising:

a first program code for detecting whether the newly installed function-extending module is inserted into the module rack; and a second program code for connecting a first port of the newly installed function-extending module to a second port of a previously installed function-extending module via a common port of a first switching unit and a selection port of a second switching unit when the newly installed function-extending module is detected as being inserted into the module rack;

wherein the second program code comprises:

a first program code portion for confirming presence of the previously installed function-extending module; and a second program code portion for connecting the second port of the previously installed function-extending module to the first port of the newly installed function-extending module via the common port of the first switching unit and the selection port of the second switching unit when there is only one previously installed function-extending module, and connecting the newly installed function-extending module to the base module.

12. The recording medium of claim 11, wherein the second program code further comprises:

a third program code portion for connecting the first port of the newly installed function-extending module to the base module when the previously installed function-extending module is not present.

13. The recording medium of claim 11, wherein the second program code further comprises:

a third program code portion for connecting the first port of the newly installed function-extending module to a second port of a function-extending module that constitutes a last node of a daisy chain of previously installed function-extending modules when a number of the previously installed function extending modules is at least two, and for detachably connecting the newly installed function-extending module to the base module.

14. A method for connecting a plurality of function-extending modules, which are detachably inserted into a module rack, to a base module capable of reproducing audio/video (AV) data to be communicated, the method comprising the steps of:

(a) detecting whether said function-extending modules are inserted into the module rack; and (b) connecting the detected said function-extending modules to the base module;

wherein step (b) comprises:

(b21) checking for presence of a previously installed function-extending module; and (b22) connecting a second port of the previously installed function-extending module to a first port of a newly installed function-extending module via a common port of a first switching unit and a selection port of a second switching unit and connecting the newly installed function-extending module to the base module when only one previously installed function-extending module is present.

* * * * *